March 29, 1927.
G. E. GEISE
KASSETTE
Filed Jan. 15, 1925
1,622,371
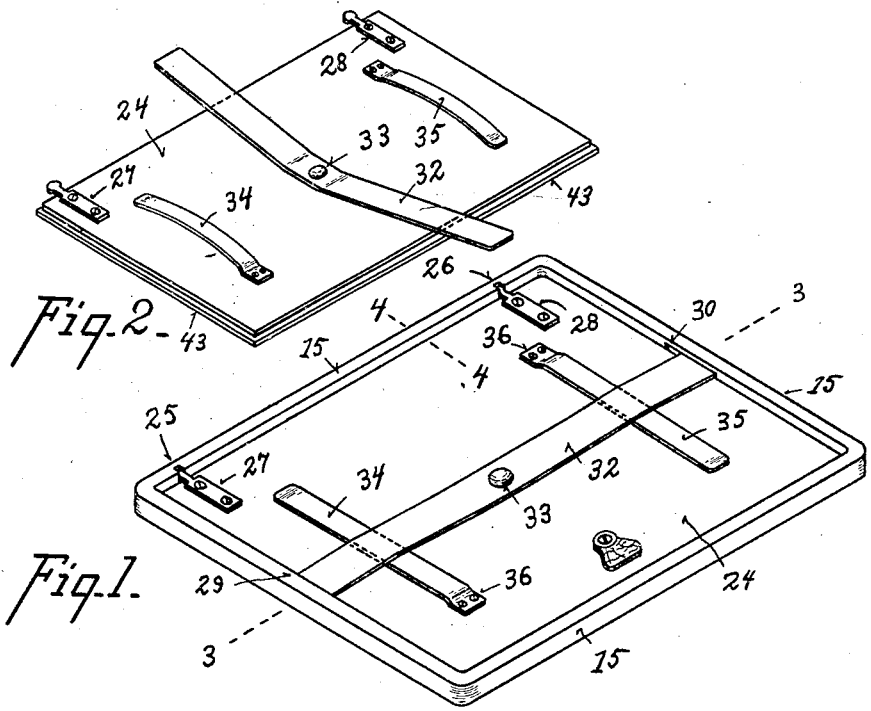
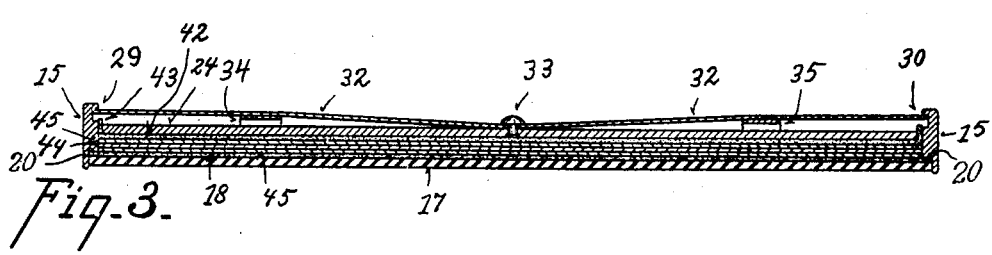
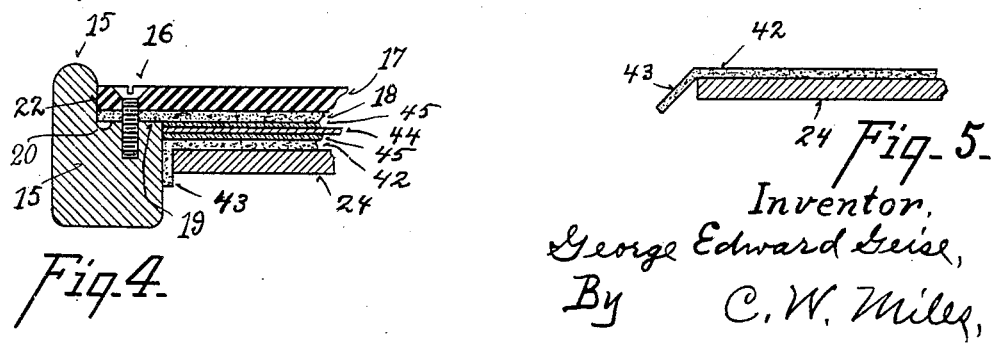
Inventor,
George Edward Geise,
By C. W. Miller,
Attorney.

Patented Mar. 29, 1927.

1,622,371

UNITED STATES PATENT OFFICE.

GEORGE EDWARD GEISE, OF COVINGTON, KENTUCKY.

KASSETTE.

Application filed January 15, 1925. Serial No. 2,639.

My invention relates to improvements in kassette for holding sensitive plates in X-ray photography. One of its objects is to provide an improved kassette in which the pressure is applied and distributed more uniformly over the entire surface of the sensitive plate. Another object is to provide an improved kassette in which a substantially uniform pressure can be applied and distributed over the entire face of the sensitive plate and applied and released at a single operation. Another object is to provide an improved kassette adapted to support sensitive plates in conjunction with an intensifying sheet or member, and adapted to apply the intensifying sheet to one face of the sensitive plate, with a uniformly distributed pressure so that the contact and hence the effect of the intensifying sheet may be uniform over the entire surface of the sensitive plate. Another object is to provide an improved kassette in which the detachable back is provided with an improved arrangement and combination of resilient members to yieldingly hold the back in place with a substantially uniform pressure over the whole face of the sensitive plate. My invention also comprises certain details of form and combination and arrangement of components, all of which will be fully set forth in the description of the accompanying drawings, in which:

Fig. 1 is a perspective view showing the rear face of a kassette with the back plate locked in place, embodying my invention.

Fig. 2 is a perspective view of the back plate of Fig. 1 detached.

Fig. 3 is a section through the kassette shown in Fig 1, taken on line 3—3 of Fig. 1.

Fig. 4 is an enlarged sectional detail taken for instance on line 4—4 of Fig. 1.

Fig. 5 is a detail of a portion of the back detached.

The accompanying drawings illustrate the preferred embodiment of my invention in which 15 represents a rectangular metal frame to one face of which is secured by means of screws 16, or otherwise a face plate 17 of material which is pervious to X-rays but impervious to light rays. In rear of the face plate 17 I preferably employ a sheet of resilient material 18, as for instance a sheet of wool felt. The frame 15 is preferably built up to mitered side and end sections or bars which have been first machined to provide true and plane faces, as for instance at 19 where the face plate seats and is secured to the frame by the screws 16, also the channels 20, which facilitate true and light tight joints, also the faces 22 to provide close joints with the edges of the detachable back plate 24. At the time the frame sections are being machined, recesses 25 and 26 are cut in one of said sections to receive the ends of the members 27 and 28 attached to the back plate 24 and serving as adjustable hinge members on which the back plate may hinge relative to the frame 15, and also as dowel members to guide the back plate 24 truly into position relative to the frame 15. While the frame members are being machined, recesses 29 and 30 are cut in the end sections of the frame to detachably receive the ends of the resilient cross bar 32 which bar is pivotally attached at 33 to the central portion of the back plate 24. Curved straps of resilient metal 34 and 35 are respectively attached at one end to the rear face of the back plate 24 by screws 36 or similar means, while their opposite ends are free and normally slightly out of contact with the rear face of the back plate, and their middle portions considerably out of contact with the back plate.

Fig. 2 represents the normal position of the members 32, 34 and 35 when the back plate is detached. After a sensitive plate has been inserted into the frame 15 to rest upon the sheet 18, another resilient sheet similar to 18 may be applied to the rear of the sensitive plate, or if desired an intensifying sheet or pad may be applied to the front or rear face of the sensitive plate, that is a sheet or pad charged with radio active or radio sensitive material adapted to intensify on the sensitive plate the effect of exposing the plate to the influence of X-rays. The back plate 24 is then applied to the frame 15 by first entering the ends of members 27 and 28 into the recesses 25, and 26 and then allowing the rest of the back plate to fall into place within the frame 15. The resilient cross bar 32 is then turned upon its center 33 so as to engage the straps 34 and 35 and pressure applied to the cross bar 32 until its ends can be engaged by and locked in the recesses 29 and 30. The pressure of the cross bar 32 is thus applied across the center of the straps 34 and 35 so as to resiliently apply pressure to the back plate at four substantially equidistant points where the opposite ends of the straps 34 and 35 make contact with the back plate 24, thereby yieldingly and evenly distributing the pressure on the back plate, and the pressure of the back plate directly or indirectly against the sensitive plate and intensifying members, and obviating any tendency for the back plate to be strained so as to deviate from its normal plane surface, and serving to hold the intensifying sheet or sheets uniformly in contact with the face of the sensitive plate over the entire face of the plate.

The recesses 25 and 26 are cylindrical with relatively narrow slots at their inner sides, and the ends of members 27 are substantially counterparts thereof, that is balls or circular disks with relatively narrow connecting bars. Said balls or disks are free to move in or out in the cylindrical recesses 25 and 26, so that irrespective of the thickness of the sensitive plate or of the sheets or pads interposed therewith between the frame and back plate, the back plate is free to adjust itself at its hinge members 27 and 28 to the frame so as to seat evenly upon the sensitive plate and to apply and evenly distribute pressure upon the sensitive plate. Also where one or more intensifying sheets are employed to so uniformly and accurately distribute the pressure as to secure uniform contact relations over the entire face or both faces of the sensitive plate and the adjacent intensifying sheet or sheets, so that the intensifying effect shall be uniform instead or irregular over the entire face of the sensitive plate. It is the practice at present to provide sensitive plates or films 44 which have been sensitized either upon one face or upon both faces, and to employ therewith either a single intensifying sheet 45 where one face only is sensitized, or to employ two intensifying sheets 45 upon opposite sides of the plate or film where both faces have been sensitized.

A sheet of felt 42 is preferably attached to the inner face of the back plate with its edges 43 overhanging the edges of the back plate, so that when the back plate is pressed into place in the frame the overhanging edges of the felt will be bent backwardly between the inner wall of the frame and the edges of the back plate to form a light tight joint between the back and frame. The straps 34 and 35 being attached to the rear face of the back plate at one end are both firmly held thereto against displacement and the cross bar 32 glides freely into and out of relation to said straps.

The apparatus herein shown and described is capable of considerable modification within the scope of the claims without departing from the spirit of my invention.

What I claim is.

1. A kassette comprising a frame having a peripheral flange, and a face pervious to X-rays and impervious to light rays, a back plate impervious to light rays to detachably fit said frame in rear of a sensitive plate and adapted to move into engagement with said frame in planes parallel with the face plate of said frame, a cross-bar of resilient material pivotally attached to the rear face of said back near the center thereof and adapted to have its opposite ends detachably engaged with said frame, and a pair of transverse bars of resilient material located upon opposite sides of the pivot of said cross-bar and transversely to said cross-bar when engaged with said frame, each of said transverse bars being rigidly attached at one end to said back plate and curved outwardly from said back plate through its central portion and bearing rigidly at one end and slidingly at its opposite end upon the rear face of said back plate, said cross-bar serving to resiliently engage the curved central portions of said transverse bars when the ends of said cross-bar are engaged with said frame to simultaneously apply and substantially equally distribute pressure at four substantially equidistant points where the ends of said transverse bars engage said back plate to yieldingly hold said back plate in position with reference to said frame and a contained sensitive plate and intensifying member contained therein.

2. A kassette comprising a frame having a peripheral flange, a face pervious to X-rays and impervious to light rays, a back plate impervious to light rays to detachably fit said frame in rear of a sensitive plate, a cross-bar of resilient material pivotally attached to the rear face of said back near the center thereof and adapted to have its opposite ends detachably engaged with said frame, and a pair of transverse bars located upon opposite sides of the pivot of said cross-bar, each curved outwardly from said back through its central portion and bearing at its ends upon the rear face of said back plate, said cross bar resiliently engaging the curved central portions of said transverse bars to apply and substantially equally distribute pressure at four substantially equidistant points where the ends of said transverse bars engage said back plate to yieldingly hold said back plate in position with reference to said frame and a contained sensitive plate.

In testimony whereof I have hereunto affixed my signature.

GEORGE EDWARD GEISE.